United States Patent
Weld et al.

(10) Patent No.: US 10,102,047 B2
(45) Date of Patent: *Oct. 16, 2018

(54) IN-MEMORY DATA ANALYTIC SYSTEM THAT PROVIDES AN INTEGRATED TRACKING MECHANISM FOR EXPLICIT MEMORY RESOURCES

(71) Applicant: Oracle International Corporation, Redwood Shores, CA (US)

(72) Inventors: Alexander Weld, Mountain View, CA (US); Korbinian Schmid, San Mateo, CA (US); Felix Kaser, San Francisco, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/978,061

(22) Filed: May 11, 2018

(65) Prior Publication Data
US 2018/0260260 A1    Sep. 13, 2018

Related U.S. Application Data

(63) Continuation of application No. 15/080,136, filed on Mar. 24, 2016.

(51) Int. Cl.
*G06F 11/07* (2006.01)
*G06F 9/54* (2006.01)
*G06F 9/455* (2018.01)

(52) U.S. Cl.
CPC .............. *G06F 9/543* (2013.01); *G06F 9/455* (2013.01); *G06F 11/0718* (2013.01); *G06F 2009/45583* (2013.01)

(58) Field of Classification Search
CPC ...... G06F 9/543; G06F 9/455; G06F 11/0718; G06F 2009/45583
See application file for complete search history.

(56) References Cited

U.S. PATENT DOCUMENTS

| | | | |
|---|---|---|---|
| 4,782,325 | A | 11/1988 | Jeppsson et al. |
| 5,742,792 | A | 4/1998 | Yanai et al. |

(Continued)

FOREIGN PATENT DOCUMENTS

| | | |
|---|---|---|
| EP | 2 608 070 A1 | 6/2013 |
| GB | 1 332 631 A | 10/1973 |
| WO | WO2007/078444 A1 | 7/2007 |

OTHER PUBLICATIONS

Valgrind User Manual, "Memcheck: A Memory Error Detector", http://valgrind.org/docs/manual/mc-manual.html, last viewed on Sep. 30, 2015, 24 pages.

(Continued)

*Primary Examiner* — Reginald G Bragdon
*Assistant Examiner* — Edward Wang
(74) *Attorney, Agent, or Firm* — Hickman Palermo Becker Bingham LLP

(57) ABSTRACT

Techniques and a system are provided for managing resources used by user-provided programs. The system includes an application programming interface (API) that allows user-provided programs to access memory resources managed by functions provided by the API. The system stores memory-usage records made during memory allocations. Memory-usage records may be used to identify memory resources, analyze memory usage, and provide other features.

20 Claims, 5 Drawing Sheets

(56) References Cited

U.S. PATENT DOCUMENTS

| | | |
|---|---|---|
| 5,778,430 A | 7/1998 | Ish et al. |
| 5,870,759 A | 2/1999 | Bauer et al. |
| 6,009,432 A | 12/1999 | Tarin |
| 6,018,806 A | 1/2000 | Cortopassi |
| 6,275,857 B1 | 8/2001 | McCartney |
| 6,763,440 B1 | 7/2004 | Traversat |
| 6,782,462 B2 | 8/2004 | Marion |
| 6,965,978 B2 | 11/2005 | Cohen |
| 7,149,769 B2 | 12/2006 | Lubbers et al. |
| 7,472,144 B2 | 12/2008 | Ayachitula |
| 7,533,228 B1 | 5/2009 | Garthwaite |
| 8,229,979 B2 | 7/2012 | Manolov |
| 8,433,684 B2 | 4/2013 | Munoz |
| 8,539,454 B2 | 9/2013 | Havin |
| 8,856,484 B2 | 10/2014 | Ben-Tsion et al. |
| 8,924,437 B2 | 12/2014 | Seth |
| 9,292,564 B2 | 3/2016 | Kamp et al. |
| 2005/0055380 A1 | 3/2005 | Thompson et al. |
| 2005/0165798 A1 | 7/2005 | Cherkauer et al. |
| 2006/0173833 A1 | 8/2006 | Purcell et al. |
| 2007/0156957 A1 | 7/2007 | McHardy et al. |
| 2008/0059492 A1 | 3/2008 | Tarin |
| 2008/0256250 A1 | 10/2008 | Wakefield |
| 2008/0281784 A1 | 11/2008 | Zane et al. |
| 2008/0281865 A1 | 11/2008 | Price et al. |
| 2009/0307290 A1 | 12/2009 | Barsness et al. |
| 2010/0235335 A1 | 9/2010 | Heman et al. |
| 2010/0250549 A1 | 9/2010 | Muller et al. |
| 2010/0275184 A1 | 10/2010 | Nir |
| 2011/0029569 A1 | 2/2011 | Ganesh et al. |
| 2011/0138123 A1 | 6/2011 | Gurajada et al. |
| 2012/0173515 A1 | 7/2012 | Jeong et al. |
| 2012/0323971 A1 | 12/2012 | Pasupuleti |
| 2014/0040218 A1 | 2/2014 | Kimura et al. |
| 2014/0075493 A1 | 3/2014 | Krishnan et al. |
| 2014/0122827 A1 | 5/2014 | Kumar |
| 2014/0189438 A1 | 7/2014 | Arbel |
| 2015/0088811 A1 | 3/2015 | Hase et al. |
| 2015/0088822 A1 | 3/2015 | Raja et al. |
| 2015/0088824 A1 | 3/2015 | Kamp et al. |
| 2015/0088830 A1 | 3/2015 | Kamp et al. |
| 2015/0088926 A1 | 3/2015 | Chavan et al. |
| 2015/0089125 A1 | 3/2015 | Mukherjee et al. |
| 2015/0089134 A1 | 3/2015 | Mukherjee et al. |

OTHER PUBLICATIONS

Shao et al., "Clotho: Decoupling Memory Page Layout from Storage Organization", Proceedings of the 30th VLDB Conference, Toronto, Canada, 2004, 12 pages.

Schaffner et al., "A Hybrid Row-Column OLTP Database Architecture for Operational Reporting", dated Aug. 24, 2008, 14 pages.

Ramamurthy, Ravishankar, "A Case for Fractured Mirrors" Proceedings of the 28th VLDB Conference, dated, 2002, 12 pages.

Phipps, Colin:, "Mapping Deflated Files", Internet Article, dated Jan. 6, 2013, http://zsync.moria.org.uk/paper/ch03s02.html, 3 pages.

Otto et al, "Adaptive In-Memory Analytics with Teradata: Extending Your Existing Data Warehouse to Enable SAS® High-Performance Analytics", SAS Global Forum, dated 2013, 10 pages.

Oracle, "Jvisualvm—Java Virtual Machine Monitoring, Troubleshooting, and Profiling Tool", http://docs.oracle.com/javase/6/docs/technotes/tools/share/jvisualvm.html, last viewed on Sep. 30, 2015, 2 pgs.

Nirmesh, Malviya, "Recovery Algorithms for In-Memory OLTP Databases", Master of Science Thesis, dated Jul. 1, 2012, 66 pages.

Low et al., "GraphLab: A New Framework for Parallel Machine Learning", dated Jun. 2010, 10 pages.

Low et al., "Distributed GraphLab: A Framework for Machine Learning and Data Mining in the Cloud", Proceedings of the VLDB Endowment, vol. 5, No. 8, dated Aug. 2012, 12 pages.

Khalid Sayood:, "Introduction to data Compression", Morgan Kaufmann Publisher, dated Dec. 1996, 4 pages.

IBM, "Garbage collection in WebSphere Application Server V8, Part 2: Balanced garbage collection as a new option", http://www.ibm.com/developerworks/websphere/techjo, last viewed on Jul. 31, 2015 7pgs.

Farber et al., "SAP HANA Database—Data Management for Modern Business Applications", SIGMOD Record, dated Dec. 2011, vol. 40, No. 4, 8 pages.

Enabling the Malloc Debugging Features. https://developer.apple.com/library/mac/documentation/Performance/, last viewed on Sep. 30, 2015, 3 pages.

Apple Developer, "Memory Usage Performance Guidelines", dated Apr. 23, 2013, 49 pages.

Weld, U.S. Appl. No. 15/080,136, filed Mar. 24, 2016, Office Action, dated Sep. 29, 2017.

Weld, U.S. Appl. No. 15/080,136, filed Mar. 24, 2016, Notice of Allowance, dated Feb. 22, 2018.

U.S. Appl. No. 14/337,179, filed 074/21/2014, Notice of Allowance, dated Jul. 29, 2015.

U.S. Appl. No. 14/337,179, filed Jul. 21, 2014, Office Action, dated Dec. 29, 2014.

U.S. Appl. No. 14/337,179, filed Jul. 21, 2014, Notice of Allowance, dated Nov. 3, 2015.

U.S. Appl. No. 14/337,179, filed Jul. 21, 2014, Interview Summary, dated Jun. 17, 2015.

U.S. Appl. No. 14/337,179, filed Jul. 21, 2014, Final Office Action, dated Apr. 10, 2015.

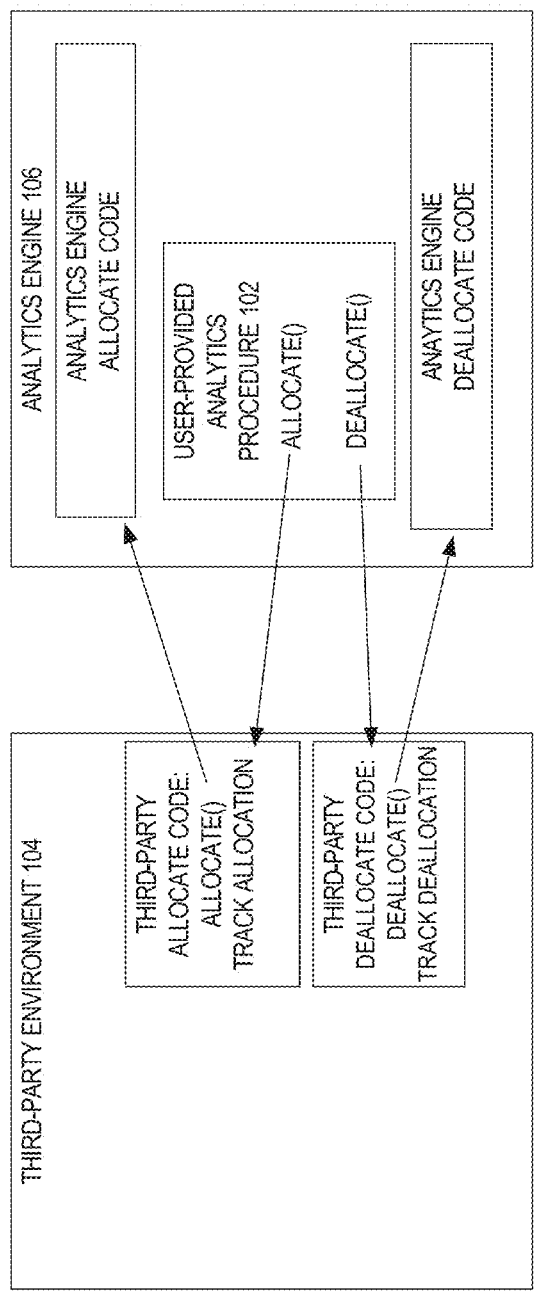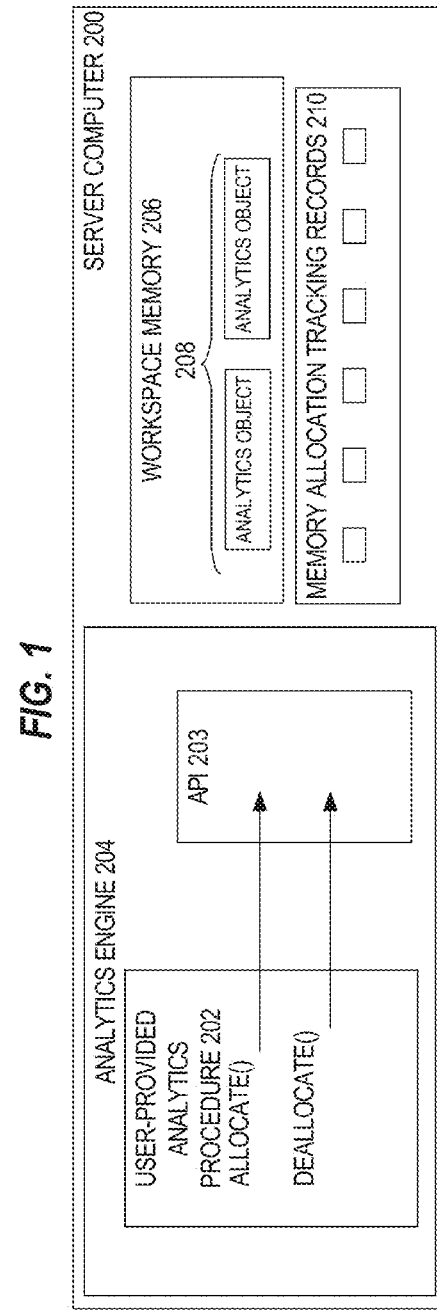

IN-MEMORY DATA ANALYTIC SYSTEM THAT PROVIDES AN INTEGRATED TRACKING MECHANISM FOR EXPLICIT MEMORY RESOURCES

CROSS-REFERENCE TO RELATED APPLICATIONS; BENEFIT CLAIM

This application is a continuation application of U.S. application Ser. No. 15/080,136, filed Mar. 24, 2016, the entire contents of which is hereby incorporated by reference as if fully set forth herein, under 35 U.S.C. § 120.

TECHNICAL FIELD

The present disclosure relates to tracking memory allocation when executing software that uses large datasets.

BACKGROUND

As the capabilities of computers increase, users have found new and novel ways to make use of these capabilities to do things that were previously simply too difficult to accomplish using non-computerized methods. Computers allow users to understand information in new and informative ways. For example, "data analytics" refers to the use of computers to discover non-immediate information regarding an original dataset, where the original dataset is often too large for humans to manually inspect, clean, or transform. Computer programs designed to perform data analytics are referred to herein as "analytic engines".

Trends in Efficient Data Analysis

Since analyzing large datasets is often expensive, requiring large amounts of time, computing resources, or monetary resources, there are a number of optimizations that may be used to improve analytic engines. There are two general trends that maximize efficiency:
  In-Memory Computation:
  Specialized computing devices with a large amount of volatile memory are often used to execute analytic engines. These specialized computing devices are often server systems which feature random access memory (RAM), such as dynamic random-access memory (DRAM), in very large capacities (e.g., one terabyte, two terabytes, and more). Such capacity allows the server to store an entire data set in-memory, which in turn allows faster computation by the analytic engines. An analytic engine that is designed to load and maintain data in volatile memory, even when not currently using the data, is referred to herein as an in-memory analytic engine. In-memory analytic engines tend to be faster than conventional analytic engines because the internal optimization algorithms are simpler and the same analysis can be accomplished by executing fewer CPU instructions. In addition, accessing data in-memory eliminates seek time when querying the data, which provides faster and more predictable performance than disk mechanisms.
  Custom Analytics Procedures:
  Customers often find the analytic procedures that are "built-in" to analytic engines insufficient for their needs. For example, such built-in analytic procedures may be too generic and may need to be customized based on analytic requirements, specific data types, specific data sets, and specific data sizes. Consequently, some analytic engines provide mechanisms that allow customers to submit their own analytic procedures to the analytics engines. Thus, the analytics engine provides the platform and environment for analyzing the data, but the actual analysis algorithm is determined by the custom analytics procedures provided by the users. Custom analytic procedures that are coded by users, rather than the makers of the analytic engines themselves, are examples of "user-provided programs".

Drawbacks and Fixes to Trends in Data Analysis

Even with these two trends, there remain important limits to how efficient analysis may be. For in-memory computation, properly managing the volatile memory is often difficult. Essentially, the performance of in-memory analytics engines relies heavily on the amount of available main (volatile) memory, since the large data set stays in-memory for the sake of fast analysis. If an analytics engine attempts to use more main memory than is available, the computation becomes extremely slow (due to swapping data to and from disk) or, even worse, the whole analytics engine can crash.

When custom analytics procedures are involved, poor coding may lead to memory leaks. Memory leaks refer to the situation where allocated memory resources are not used by the analytics engine anymore, but those memory resources are not deallocated so that the memory occupied by those resources can be reused for other things. Such memory becomes non-useful, neither used by the analytics engine to which the memory is allocated, nor available to any other applications. These memory leaks are usually introduced by an unobservant developer, who forgets to include, in their code, instructions to clean up all unused memory.

Memory leaks caused by the analytic engine itself can be avoided through careful code inspection (e.g., static code analysis), by the analytic engine developer, before the analytic engine is deployed or released. However, as mentioned earlier, modern analytic engines allow the users to submit their own analytic procedures to the analytics engines. The developer of an analytic engine has no opportunity to perform static code analysis of such user-provided programs. Consequently, it is not uncommon for memory leaks to occur when analytics engines execute user-provided analytics procedures.

One way to prevent memory leaks is to rely on memory management systems built into programming languages. Some languages (e.g., Java, C#, or many other programming languages) provide managed execution environments which provide limited garbage collection capabilities. A garbage collection mechanism built into these languages typically interrupts program execution, inspects all allocated memory resources, and reclaims every memory object that is no longer reachable from the program. However, this is not a panacea for solving memory leaks because: (a) unused objects can still be reachable (unexpectedly) through some references, and (b) programming languages often lack the ability to monitor all types of memory. For example, in Java, garbage collection is not applied to objects allocated "off heap," which are often used for holding large memory objects in data analytics.

Another way to prevent (or at least identify) memory leaks is to execute the user-provided analytic procedures in a third-party execution environment. While executing the user-provided analytic procedure, the third-party execution environment detects when the user-provided analytic procedure attempts to call the analytics engine to (a) allocate memory, (b) deallocate memory, or (c) access an allocated memory object. In response to detecting such calls, the third-party execution environment executes alternative code.

For example, referring to FIG. 1, assume that a user-provided analytic procedure 102, executing in conjunction with in third-party environment 104, makes a call to allocate memory for a resource. In response to the allocate attempt, third-party environment 104 instead executes its own "allocate" code. That allocate code may, in addition to making an allocate call to analytics engine 106, store a pointer to the allocated memory and a flag to indicate that that memory is "allocated". Similarly, when user-provided analytic procedure 102 makes a call to deallocate memory for the resource, third-party environment 104 instead executes its own "deallocate" code. That deallocate code may, in addition to making a deallocate call to analytics engine 106, also change the flag to indicate that the corresponding memory was "deallocated". Consequently, when the user-provided analytic procedure 102 has completed execution, the data maintained by the third-party environment 104 should indicate whether any memory allocated by the user-provided analytics procedure 102 remains allocated (i.e. whether the user-provided analytic procedure 102 caused a memory leak).

The insight into memory usage that is available when third-party environment 104 is used in conjunction with a user-provided analytic procedure 102 is fairly limited. For example, the third-party environment 104 does not know all the details known to the analytics engine 106 itself about the memory allocations. Details of the memory allocations are hidden from third-party environment 104 by the layer of abstraction.

Further, executing user-provided analytics procedure 102 in conjunction with a third-party environment 104 may have a huge impact on performance of the user-provided analytic procedure 102. For example, effectively imposing the third party environment 104 as an intermediary between the user-provided analytic procedure 102 and the analytics engine 106 results in overhead that can make the execution many times slower than if user-provided analytic procedure 102 were executed by analytics engine 106 directly.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 is a block diagram that shows how a user-provided program may be executed in a third party environment.

FIG. 2 is a block diagram that shows how user-provided program may be executed by an analytics engine, in an embodiment.

DETAILED DESCRIPTION

Figure 3:
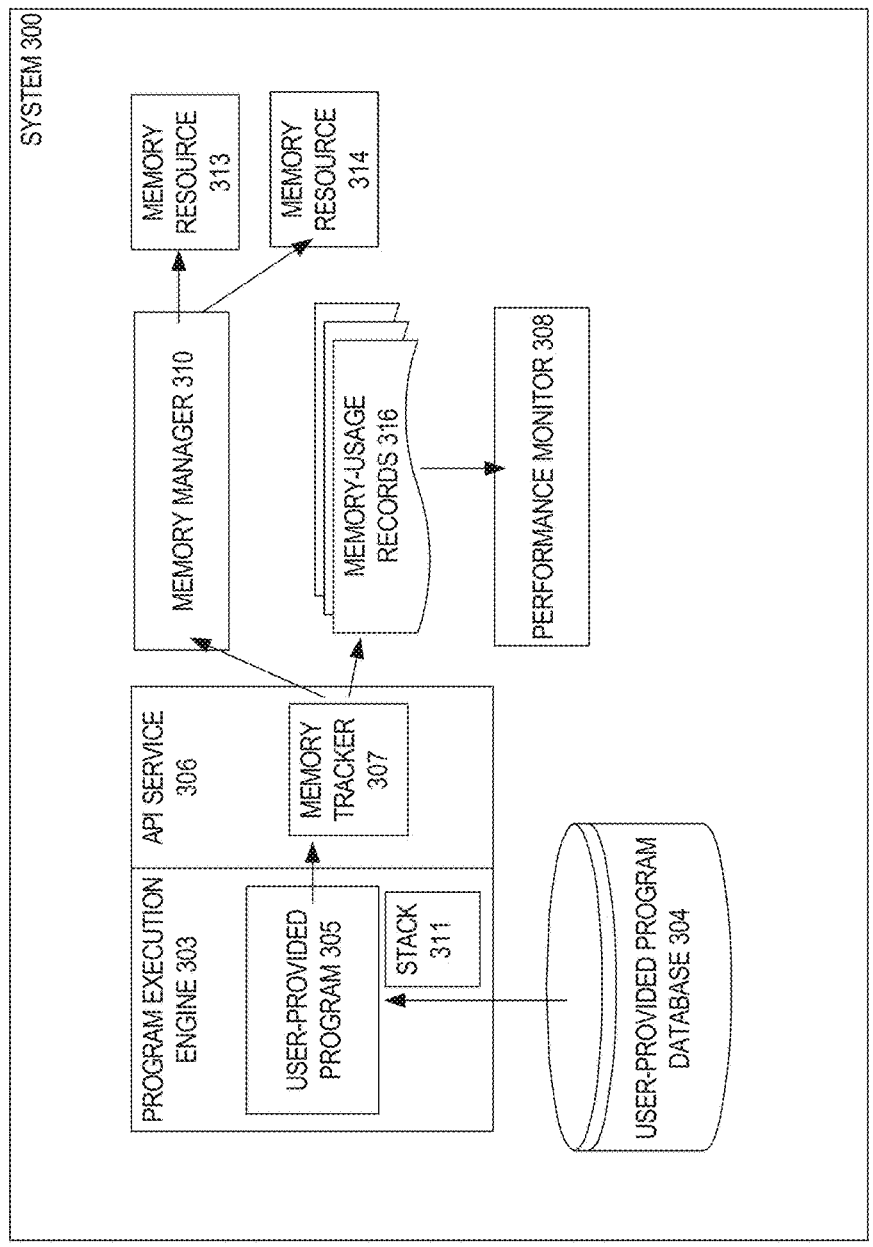
FIG. 3 illustrates an analytics system in which the techniques described may be practiced according to certain embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques and a system are provided for managing in-memory resources used by user-provided programs. The system includes an analytics engine that exposes an application programming interface (API) to user-provided programs. By making calls to the API, user-provided programs allocate, access, and deallocate the memory resources that the user-provided programs need. The analytics engine, in turn, stores and updates records based on the calls received from the user-provided program through the API. Such records may be used in a variety of ways, including but not limited to: identifying the memory resources used by the user-provided program, analyzing memory usage of the user-provided program, identifying memory leaks caused by the user-provided program, etc.

According to an embodiment, an analytic engine that employs the techniques described herein is able to track and provide information about memory usage of a user-provided program while the user user-provided program is executing. In the context of data analytics, the user-provided programs typically work on a relatively small number of large memory objects rather than a large number of small memory objects. However, the memory-usage-tracking techniques described herein are not limited to data analytics, and therefore are not limited to any particular type of user-provided program.

Embodiments of Systems for In-Memory Analytics

FIG. 2 is a block diagram that shows how a user-provided program may be executed by an analytics engine, in an embodiment. User-provided analytics procedure 202 is executed by analytics engine 204 on a server computer 200 in response to a request by a client computer (not shown). Unlike the embodiment shown in FIG. 1, the embodiment shown in FIG. 2 includes an integrated solution for executing and allocating memory. For example, the third-party environment 104 shown in FIG. 1 is not required for tracking the memory allocations of user-provided programs. Because user-provided programs need not execute with a third-party environment, execution speed of the user-provided programs is significantly increased.

Referring again to FIG. 2, user-provided analytics procedure 202 makes calls directly to an API 203 provided by analytics engine 204. According to one embodiment, the analytics engine 204 is responsible for executing the user-provided analytics procedure 202, allocating memory for the user-provided analytics procedure 202, tracking those memory allocations using a variety of metrics (e.g., data type, pointer, size), and providing advanced debugging and tracking, as discussed in greater detail elsewhere.

In an embodiment, the analytics engine 204 causes memory resources required by user-provided analytics procedure 202 to be allocated in work-space memory 206. Work-space memory 206 is server-side memory space (or hardware memory resource). Large analytics objects 208 are allocated in this space, separate from the client computer that requested execution of user-provided analytics procedure 202. User-provided programs control these large analytic objects 208 through calls made through API 203.

Unlike the third-party environment 104, analytics engine 204 is aware of memory resources that are available since analytics engine 204 is responsible for the actual allocations (e.g., determining what memory is available, allocating available memory, tracking memory, deallocating memory). Specifically, analytics engine 204 has access to information such as a type of allocation, a pointer to the location where information is stored, and size of the information, which may not be available to the third-party environment 104. The availability of this additional information allows the analytics engine 204 to incorporate advanced debugging and tracking features. In one embodiment, the tracking and debugging involves storing and updating memory allocation tracking records 210 in response to calls made by user-provided analytics procedure 202 through API 203. Examples of advanced debugging and tracking features that may be employed in conjunction with analytics engine 204 shall be described in detail hereafter.

System Overview

FIG. 3 illustrates an analytics system 300 in which the techniques described herein may be practiced according to certain embodiments. The analytics system 300 is a computer-based system. The various components of analytics system 300 are implemented at least partially by hardware at one or more computing devices, such as one or more hardware processors executing instructions stored in one or more memories for performing the various functions described herein. The analytics system 300 illustrates only one of many possible arrangements of components configured to perform the functionality described herein. Other arrangements may include fewer or different components, and the division of work between the components may vary depending on the arrangement.

In the embodiment illustrated in FIG. 3, analytics system 300 includes a user-provided program database 304, a program execution engine 303, an API service 306, a performance monitor 308 and a memory manager 310. Each of these components of analytics system 300 shall be described hereafter in greater detail.

The User-Provided Program Database

The user-provided program database 304 stores the code of user-provided programs. In response to a request from a client computer to execute a particular user-provided program, program execution engine 303 obtains the code of the user-provided program from database 304, and executes the code. In the embodiment illustrated in FIG. 3, user-provided program 305 is being executed by program execution engine 303. During execution of the code, user-provided program 305 makes calls to API service 306 to allocate, access, and deallocate memory resources, as well as to access any other functionality provided by analytics system 300.

In the embodiment illustrated in FIG. 3, analytics system 300 is an analytics system and the user-provided programs that are stored in database 304 are user-provided analytics procedures. However, the techniques described herein are not limited to any particular type of user-provided program. Unlike analytic procedures built-in to an analytics engine, user-provided programs stored in database 304 are created by software developers outside of the control of the analytics engine developer.

The user-provided programs that are executed by program execution engine 303 may be in different formats. For example, in one embodiment, the analytics system 300 accepts code in source code format. Some popular programming languages of source code that may be used by the analytics system 300 include C, C#, C++, Java, Python, PHP, and many others. In another embodiment, user-provided programs include code in other formats such as runtime format, executable format, compiler format, interpreter format, object code format, bytecode format, and machine code format.

The Program Execution Engine

Program execution engine 303 generally represents the code, within analytics system 300, responsible for executing user-provided program 305. As program execution engine 303 executes user-provided program 305, program execution engine 303 updates an execution stack 311 when user-provided program makes calls, and when user-provided program returns from calls. For example, assume that during execution of user-provided program 305:
  method X of object X is called, then
  method X of object X calls method Y of object Y, then
  method Y of object Y calls method Z of object Z.

At this point in execution, the state of stack 311 would be: method X of object X on the bottom, method Y of object Y next, and method Z of object Z on the top. As user-provided program 305 continues to execute, method Z of object Z may complete execution, causing execution to return to method Y of object Y. Upon return to method Y of object Y, the record of method Z of object Z would be removed from the stack 311, leaving only method X of object X on the bottom, and method Y of object Y on the top.

The API Service and Memory Tracker

API service 306 generally represents the code of analytics system 300 that is called by user-provided programs for those user-provided programs to access functions of the analytics system 300. For example, user-provided programs may be disallowed from directly accessing memory objects that are allocated by the analytics system 300. Instead, all such accesses must be done through calls by the user-provided programs to API service 306.

API service 306 may include libraries, drivers, documentations, or tools (e.g., debugging tools, tracking tools, optimization tools) to allow programmers access to the analytics system 300's functionality. API service 306 allows the analytics system 300 to hide some of the complexity that goes into creating the analytics system 300 and how various functionality of the analytics system 300 occurs, while leaving users able to interact with features built into the analytics system 300 at a higher level of abstraction.

According to one embodiment, functions exposed to user-provided program 305 by API service 306 API include allocation of memory, deallocation of memory, performance check, status check, or any combination of these.

In an embodiment, when user-provided program 305 causes memory allocations to occur by making calls to the API service 306, a memory tracker 307 directly integrated with the API service 306 creates, deletes and/or updates memory-usage records 316 to provide memory tracking capability. The memory tracker 307 maintains information about the large memory objects (e.g., 313, 314) that are created and accessed by user-provided program 305. According to an embodiment, the memory tracker 307 automatically performs certain operations when certain calls are received from user-provided program 305. According to one embodiment, the operations performed by memory tracker 307 include:

At Allocation:

In response to an allocation call from user-provided program 305 to allocate memory for a particular object, memory tracker 307 creates a memory-usage record that indicates, among other things (a) the particular object and/or type of object within user-provided program for which the memory allocation call was made, (b) a stack-trace that indicates the state of program execution stack 311 at the time the allocation call was made, (c) the size of the allocated memory, and (d) the time at which the allocation call was made. These are merely examples of the types of information that each memory-usage record may have about the particular allocated memory object to which the record corresponds.

At Deallocation:

In response to a deallocation call from user-provided program 305 to deallocate memory for a particular object, memory tracker 307 deletes the appropriate memory-usage record.

At any Random Point of Execution:

In response to a check allocation call, the memory tracker 307 checks the memory-usage records and reports the current state of memory allocations by user-provided program 305. According to one embodiment, check allocation calls may be made by user-provided code or by other code, such as a debugging module.

At the End of the User-Provided Program:

In response to termination of user-provided program 305, memory tracker 307 may use the memory-usage records to determine which object were not properly deallocated by user-provided program 305. These objects, which represent memory leaks, can then be deallocated automatically by the memory tracker 307.

In one embodiment, memory tracker 307 may be configured to report on the current state of memory allocation by user-provided program 305. The code for reporting memory allocation state may be built into memory tracker 307, or may be a separate module (e.g. performance monitor 308). Regardless of where the memory-usage reporting code is implemented, such memory-usage reports may include, among other things, an indication of the state of stack 311 during the allocation of each of the objects that have not yet been deallocated, and an indication of the type of object that corresponds to the memory allocation (e.g. array, collection, graph, etc.).

In an embodiment, the memory tracker 307 is enabled by default. However, in alternate embodiments, memory tracker 307 has the capability to be enabled/disabled on-the-fly. When the memory tracker 307 is disabled, the overhead of maintaining memory-usage records 316 is avoided. However, the overhead of the tracking is relatively low because, under typical scenarios, only a small number of large objects need to be tracked.

On-the-Fly Memory Usage Updates

As mentioned above, one piece of information that may be tracked for each allocated memory object is the size of the object. At allocation, the allocated size of the object is recorded in the corresponding memory-usage record. However, in some circumstances, the size of an object may chance after allocation. Therefore, according to one embodiment, every call to API service 306 that results in a size change to an allocated memory object causes the size information in the corresponding memory-usage record to be updated.

On-the-Fly Memory Usage Reporting

In large user-provided programs, it may be useful to know the state of memory usage at a particular point while the program is executing. For example, there may be a particular block of code within a user-provided program that may be suspected of causing memory leaks. Rather than wait for execution of the user-provided program to complete execution before checking the memory usage of the user-provided program, the memory usage can be reported "on-the-fly" immediately after the suspect block of code has executed. This on-the-fly reporting of memory usage may be accomplished, for example, by calling the "check allocation" method provided by memory tracker 307, as described above.

On-the-fly reporting may be invoked repeatedly during execution of a user-provided program. Because each report represents a "snapshot" of the programs memory usage, a chronological sequence of such snapshots provides an "allocation historical" of the memory usage of the user-provided program over time. Such a history may be useful in identifying the points in execution where the program's memory usage is greatest. Based on this information, it may be possible for the programmer of the user-provided program to modify the program to decrease the maximum memory demand of the user-provided program.

According to one embodiment, the user-provided program 305 may invoke the check allocation method of memory tracker 307 to obtain on-the-fly reporting of its own memory usage. Alternatively, the check allocation method may be called by other processes, such as a performance monitor 308. In addition to or instead of invoking the check allocation method of memory tracker 307, performance monitor 308 may access memory-usage records 316 directly.

Object-Oriented Implementation Example

Figure 4:
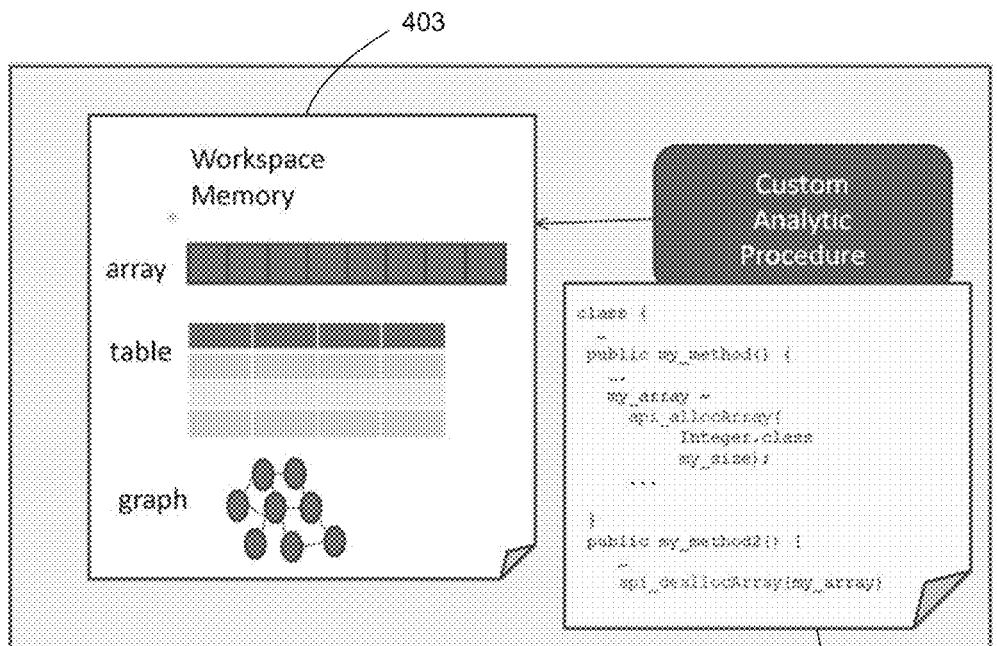
FIG. 4 shows a high-level overview of an in-memory analytic system.

FIG. 4 is a block diagram that depicts how the memory-tracking techniques described herein may be implemented an object-oriented system, according to one embodiment. Referring to FIG. 4, it illustrates a portion of source code 401 of user-provided program 305. The source code 401 defines two methods (my_method and my_method2). In my_method, a call is made to allocate memory for an object named "my_array". In my_method2, a call is made to deallocate the memory for the object named "my_array".

In this example, "my_array" is an array, which is one type of a "large analytics object". A large analytics object is an object that involves a large memory foot print. A large memory foot print may mean that each item in the object is large, that there are many items in the object, or a combination of these. Some examples of large analytics object types that may be used in the analytics system 300 include: array, collection (e.g., list, vector, set, map), matrix, table, or graph. For example, the graph type includes data stored in a node-edge format, so that data stored in the type include different nodes of information with edges representing various connections between the different nodes of information.

Nodes may be one-, two-, three-, or more degrees of separation from other nodes. The degree of separation indicates how far apart two different data points are from each other. Some data points may not be related to another data point, regardless of a number of degrees of separation.

In an object-oriented implementation, analytics system 300 may provide code that implements a "LargeAnalyticsObject" class, and code that implements various subclasses of the Large AnalyticsObject class. In one embodiment, subclasses of the LargeAnalyticsObject class are provided for arrays, collections, matrices, tables and graphs. The variable "my_array", referenced in source code 401, corresponds to an instance of the class "array", which in turn is a subclass of the LargeAnalyticsObject class. Each of these subclasses inherits the methods of the LargeAnalyticsObject class, and may define one or more subclass-specific attributes and/or methods.

API service 306 includes methods for each subclass of LargeAnalyticsObject. For example, each subclass may include an allocation (creation) function and a deallocation (deletion) function. Additionally, these subclasses may include type-specific functions such as partial mutations or the addition or removal of an element. For example, a graph type may include a function to remove a node from a graph, while a list type may include a function to remove a list element from a list.

Example Attributes of the Large Analytics Object Class

Referring again to FIG. 4, workspace memory 403 generally represents the server-side memory space that is used by analytics system 300 to allocate large objects used by user-provided program 305. According to one embodiment, only large analytics objects used by user-provided program 305 are allocated in workspace memory 403. Smaller analytic objects used by user-provided program 305 may be managed by built-in memory management mechanisms (e.g., defined by the source code).

User-provided program 305 controls (allocates, deallocates and accesses) the large analytic objects it uses by making calls to API service 306, as described above. The workspace memory 403 may be implemented in many different ways. In an embodiment, in a Java-based implementation, workspace memory 403 can be implemented as "off-heap" space.

Figure 5:
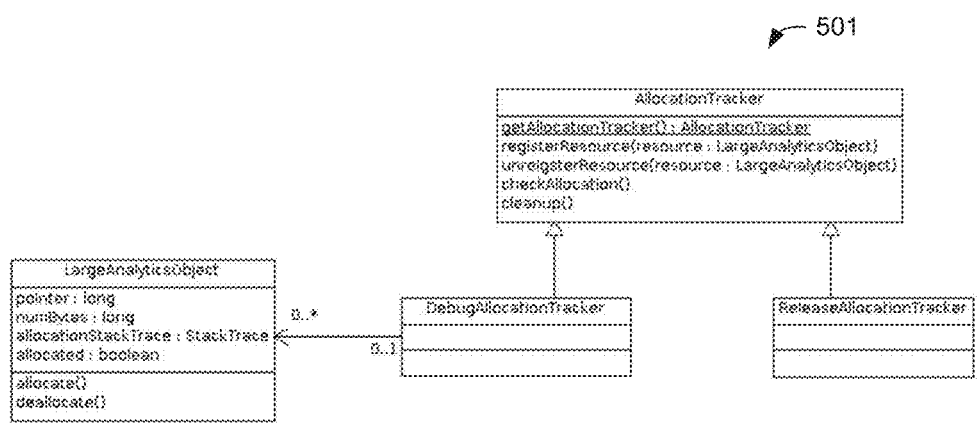
FIG. 5 shows a mapping of relationships between different classes available in the analytics system.

FIG. 5 shows a mapping of relationships between different object classes available in an object-oriented implementation of analytics system 300, according to an embodiment. As mentioned above, analytics system 300 defines a "LargeAnalyticsObject" class, which is inherited by every subclass, used by user-provided program 305, for which space is allocated in the workspace memory 403. In the illustrated embodiment, the LargeAnalyticsObject class defines attributes for storing basic information about the corresponding large objects. When memory for a LargeAnalyticsObject (or a subclass thereof) is allocated, an object instance is created, and the attributes of the object instance are populated with the appropriate attribute values.

In the illustrated embodiment, the attributes of LargeAnalyticObjects, and the subclasses thereof, include:
(1) A reference or identifier to the work-space memory that is allocated for the object instance. For example, if a user-provided program is provided in JAVA format with "off-heap" memory, this is a pointer-handle of type long.
(2) A size of the allocated memory in bytes.
(3) A stack trace that represents the state of stack 311 when the user-provided program 305 made the call to allocate the object instance. According to one embodiment, the stack trace includes a record, for each time a function is called in user-provided program 305. An alternate embodiment may also include the called function's parameters and local variables declared in the function; and
(4) A flag indicating whether the memory is still allocated.

The LargeAnalyticsObject class, and the subclasses thereof, define or inherit methods for allocating and deallocating the corresponding objects within workspace memory 403.

Example Allocation Tracker Class

In an object-oriented embodiment, the functionality of memory tracker 307 may be implemented in whole or in part by an AllocationTracker object class, as illustrated in FIG. 5. The "AllocationTracker" class 501 defines functions for registering and unregistering instances of the LargeAnalyticsObject class (or the subclasses thereof). The AllocationTracker class also includes functions for providing information about all currently registered memory resources.

In the embodiment illustrated in FIG. 5, the AllocationTracker class has two subclasses: DebugAllocationTracker and ReleaseAllocationTracker. For maximum memory usage tracking, the DebugAllocationTracker subclass is used. The ReleaseAllocationTracker subclass, which is an implementation of the AllocationTracker classes designed for user-provided applications that have been thoroughly tested and/or released, shall be described in greater detail hereafter.

There may be more than one instance of the DebugAllocationTracker class executing on a computing device. According to one embodiment, each instance of DebugAllocationTracker performs memory usage tracking for one or more user-provided programs. In the illustrated embodiment, AllocationTracker and the subclasses thereof include the following methods: registerResource, unregisterResource, checkAllocation, and cleanup. Each of these methods shall be described in greater detail hereafter.

Registering a Resource

When a user-provided program makes a call to allocate memory for an instance of a "LargeAnalyticsObject" class, or subclass thereof, analytics system 300 responds to that call by (a) calling memory manager 310 to cause memory for the resource to be allocated (e.g. in workspace memory 403), and (b) calling the registerResource method of an instance of DebugAllocationTracker. For example, source code 401 includes the call:
"my_array=api_allocArray(
 Integer.class
 my_size),"

In response to executing this call, the code that implements api_allocArray is executed. Execution of the api_allocArray method causes a call to be made to memory manager 310 to cause memory within workspace memory 403 to be allocated for the array instance "my_array". The array instance thus allocated has the attributes and methods of the array subclass of the LargeAnalyticsObject class. Thus, the my_array object would include, among other things, an indication that the object is of type "array", and the stack trace that existed at the time the api_allocArray method was invoked to create the my_array object.

After memory for the my_array instance has been allocated, the api_allocArray method calls the registerResource method of an instance of DebugAllocationTracker. In making this call, the api_allocArray method passes a reference that was created for the newly created my_array instance.

The registerResource method, in turn, adds information about the newly created my_array instance to a linked list. It is this linked list that constitutes the memory-usage records 316 illustrated in FIG. 3, according to one embodiment.

Unregistering a Resource

When a user-provided program makes a call to deallocate memory for an instance of a "LargeAnalyticsObject" class, or subclass thereof, analytics system 300 responds to that call by (a) calling memory manager 310 to cause memory for the resource to be deallocated (e.g. in workspace memory 403), and (b) calling the unregisterResource method of an instance of DebugAllocationTracker. For example, source code 401 includes the call:

"api_deallocArray(my_array)"

In response to executing this call, the code that implements api_deallocArray is executed. Execution of the api_deallocArray method causes a call to be made to memory manager 310 to cause memory within workspace memory 403 that was allocated to "my_array" to be deallocated. The api_deallocArray method also calls the unregisterResource method of an instance of DebugAllocationTracker. In making this call, the api_deallocArray method passes a reference to the my_array instance.

The unregisterResource method, in turn, removes the information about the my_array instance from the linked list. Significantly, if api_deallocArray is never called, then the memory allocated to the my_array instance remains allocated until the cleanup( ) method of the appropriate AllocationTracker instance is called, as shall be described hereafter.

Check Allocation Method

As mentioned above, the techniques described herein provide a mechanism to perform on-the-fly memory usage reporting. The code that provides memory usage reporting is represented by performance monitor 308 in FIG. 3. In the object-oriented embodiment illustrated in FIG. 5, performance monitor 308 is implemented as the checkAllocation method of the AllocationTracker object. Specifically, the checkAllocation method of the AllocationTracker instance that is tracking memory usage of a particular user-provided program may be called at any time during or after execution of the user-provided program. In response to a call to the checkAllocation method, the AllocationTracker instance returns the information currently stored on the linked list it is managing for that user-provided program.

As mentioned above, assuming that the DebugAllocationTracker subclass is used, the linked list managed by the AllocationTracker instance includes a record for every not-yet-deallocated object that was allocated to the user-provided program through a call to the allocation method provided by API service 306. According to one embodiment, the information returned by the check allocation method for each allocated object identified in the list includes, but is not limited to:

The position of the allocated memory;
The time at which the allocation call was made;
The size of the allocated memory in bytes;
The stack-trace when the allocation happened;
The type of the object holding the memory resource (e.g., array, collection, matrix, table, or graph) and
Class-specific information such as, for arrays, the current number of elements in the array and for graphs, the maximum number of nodes in the graph.

Based on the information returned by the checkAllocation method, various additional memory-usage statistics may be derived. For example, in one embodiment, the start time of a user-provided program is recorded. Based on the recorded start time and the time at which an allocation call was made, it may be determined how much time passed between the start of the user-provided program and the allocation call. As another example, by summing the sizes of the individual currently-allocated objects, the total amount of memory used by all currently-allocated in-memory objects of that user-provided program, at the time the check allocation method is called, may be determined. As mentioned above, calls to checkAllocation may be made after certain critical blocks of code in the user-provided program, at the end of execution of the user-provided program, or periodically during execution of the user-provided program (to obtain a history of memory usage).

Cleanup Method

The embodiment of the AllocationTracker class illustrated in FIG. 5 includes a cleanup method. Calling the cleanup method of an AllocationTracker instance causes the AllocationTracker instance to deallocate all objects that are represented by records that remain on the linked list that it is being maintained for a user-provided program. Typically, to avoid deallocating objects that are still needed, the cleanup method would be called after the user-provided program has completed execution.

In situations where the user-provided program has no memory leaks, the linked list will be empty at the time the user-provided program terminates. Consequently, the cleanup method will not have to deallocate anything. On the other hand, if any memory leaks did occur, then calling the cleanup method of the AllocationTracker will free up the memory that was erroneously left allocated by the user-provided program. According to one embodiment, the cleanup method may first check to see if the linked list is empty. If the linked list is empty, then the cleanup method is done. On the other hand, if the linked list is not empty, then the cleanup method may call the checkAllocation method to report memory leaks, and then deallocate all objects identified in the records that remain in the linked list.

In some situations, the designer of a user-provided program may choose to not automatically deallocate objects in order to save (or re-use) the analytic objects with other user-provided programs. To keep such objects allocated in memory after the user-provided program completes execution, the user-provided program must not deallocate them, and the cleanup method of the AllocationTracker object is not called. Code other than the user-provided program that allocated the large objects may then call the checkAllocation method of the appropriate AllocationTracker instance to obtain the information necessary to access and make use of those large objects.

Multiple Implementations of the Allocation Tracker Class

In the embodiment illustrated in FIG. 5, the analytics system 300 includes two subclasses of the "Allocation- Tracker" class: ReleaseAllocationTracker and DebugAllocationTracker. According to one embodiment, the methods of the DebugAllocationTracker class are implemented as described above, causing a corresponding memory-usage record to be added to a linked list at each LargeAnalyticsObject allocation call made by the user-provided program, and causing the corresponding memory-usage record to be removed from the linked list at each LargeAnalyticsObject deallocation call made by the user-provided program.

In contrast, the ReleaseAllocationTracker may implement the same methods as DebugAllocationTracker, but implement those methods in a way that skips the overhead of tracking the allocations and deallocations of the user-provided program. The code of the user-provided program can be easily modified to invoke the ReleaseAllocationTracker subclass instead of the DebugAllocationTracker subclass after the user-provided program has been fully tested and is ready for release. Such a change will cause the ability to track memory usage in the manner described above to be lost, but will gain some performance benefit by avoiding the overhead of using memory tracker 307 to track the memory usage of the user-provided program.

Parameter-Based Memory-Usage Tracking Level

In an alternative embodiment, a single class of AllocationTracker may be used, where the value of an input parameter passed during an allocation call indicates whether memory allocation tracking should be used for the object created by that allocation call. Thus, for some allocation calls, no memory-usage records would be generated. For other allocation calls, memory-usage records would be generated and added to the list maintained by the corresponding AllocationTracker instance.

In yet another embodiment, the allocate method of the LargeAnalyticsObject class includes an input parameter to indicate whether to even call registerResource for any given allocation call. When the input parameter indicates "no tracking", the API service 306 calls memory manager 310 to allocate memory for the object in question, but no corresponding call is made to registerResource of an AllocationTracker object.

In yet other embodiments, an input parameter to allocation calls made by the user-provider program indicates one of multiple possible levels of memory usage tracking. For example, when an allocation call made by a user-provided program specifies "trackinglevel3", the memory-usage record for the allocation includes the maximum amount of information about the corresponding memory allocation. On the other hand, when an allocation call made by a user-provided program specifies "trackinglevel0", no memory-usage record is generated at all for the corresponding memory allocation. In such an embodiment, allocation calls with input parameter values of "trackinglevel1" or "trackinglevel2" may cause progressively more information about the allocation to be included in the corresponding memory-usage record.

Process Overview

Figure 6:
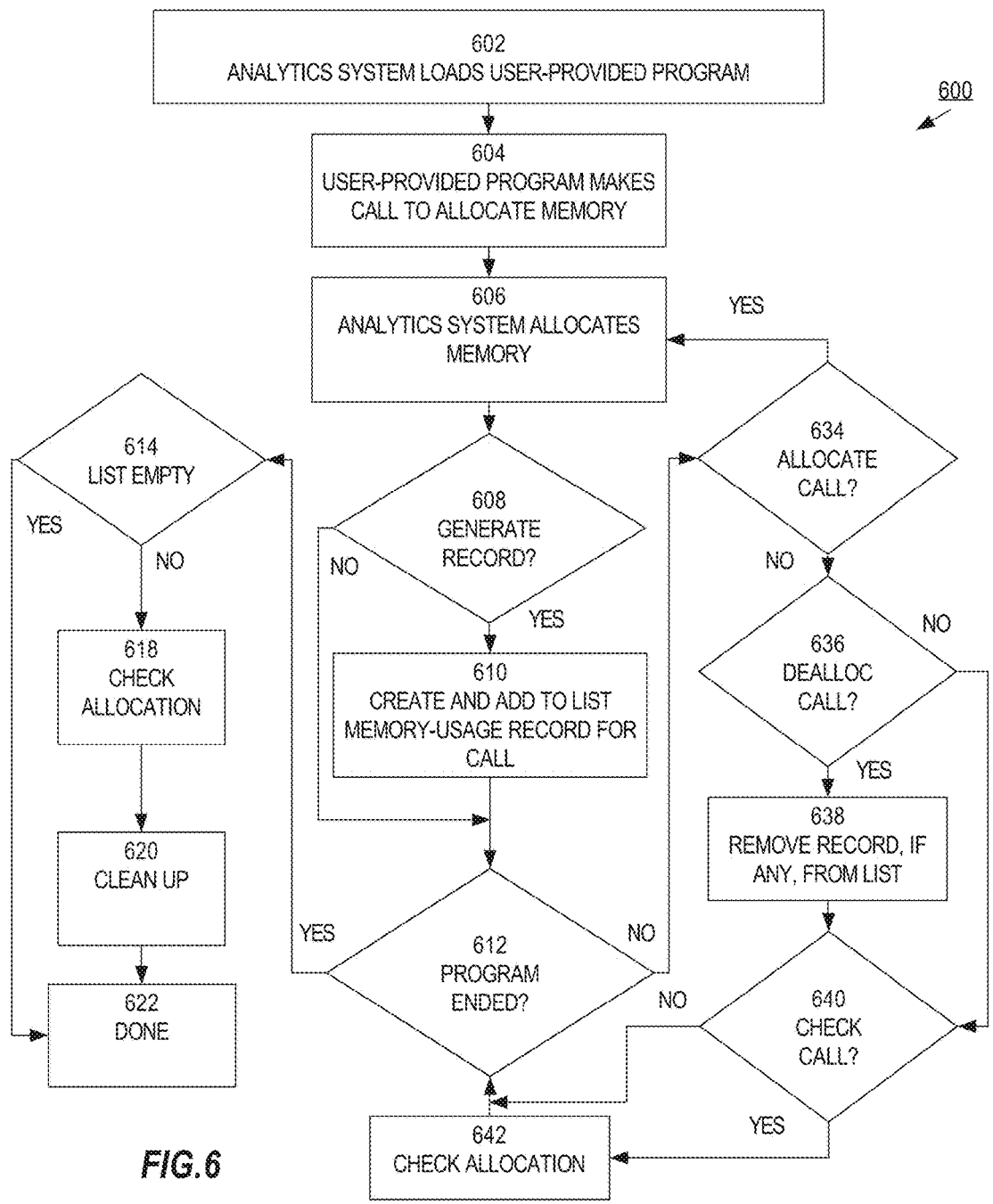
FIG. 6 is a flowchart that depicts an example process for executing a program in an in-memory analytics system.

FIG. 6 is a flowchart that depicts an example process 600 for executing a user-provided program in the analytics system 300, according to an embodiment. In step 602, the analytics system 300 receives instructions to execute a user-provided program. The instructions may come from a computing device different than a computing device that is executing analytics system 300. In a step 604, the user-provided program makes a call to allocate memory for a large object. In a step 606, the analytics system 300 allocates the memory by using an allocation call. Different parameters may be provided when allocating memory.

In a step 608, the analytics system 300 determines whether a flag or other indication is provided with the allocation call to record information about the allocation call. The indication may be provided as part of the call or by a default setting in the analytics system 300 to generate a record for every allocation call.

In a step 610, if the flag or other indication is set, the analytics system 300 creates and adds to list a memory-usage record a record for the call. As mentioned above, this memory-usage record may be placed on a linked list, stack, array, or other data structure. The record may include various pieces of information related to the call. Some examples of information included with a record are the class of object for which the allocation was made, a size of the allocated memory, a pointer to the allocated memory, other information related to the allocation operation, or any combination of these.

In a step 612, after step 610 or if the analytics system 300 determines the flag or other indication is not set, the analytics system 300 determines whether the user-provided program has ended. For example, after executing commands included in the user-provided program (e.g., adding, modifying, or deleting information stored in allocated memory), there remain no further instructions to execute as part of the user-provided program.

In a step 614, the analytics system 300 determines whether the list storing records is empty. For example, as the user-provided program executes, it may include more allocate calls than deallocate calls. If there are more allocate calls than deallocate calls in the user-provided program, then the list will include at least one record, indicating information regarding an allocate call where no respective deallocate call was executed.

In a step 618, the analytics system 300 checks what allocation call information remains in the list storing records. In a step 620, the analytics system 300 cleans up remaining allocation calls using the information stored in the list. For example, the analytics system 300 may determine which areas of memory are being used by remaining allocation calls, what size the remaining allocations are, what data type was used by the remaining allocations, or any combination of these.

In a step 622, the analytics system 300 completes execution. Alternatively, if the list is empty as determined in the step 614, the analytics system 300 completes execution.

In a step 634, if the user-provided program has not completed executing, the analytics system 300 continues execution of the user-provided program and determines whether there are additional allocation calls.

In a step 636, the analytics system 300 determines whether there are deallocation calls in the user-provided program. In a step 638, if there is a deallocation call, the analytics system 300 removes records for allocation calls made according to the user-provided program from the list. The deallocation call may specify one or more allocation calls to deallocate memory for. For example, the deallocation call may deallocate all memory objects associated with allocation calls or deallocate a subset of memory objects allocated by allocation calls.

In a step 640, the analytics system 300 determines whether there is a check call in the user-provided program. As discussed in greater detail elsewhere, the analytics system 300 includes capabilities to provide details on allocated memory for a user-provided program at any time while the user-provided program executes.

In a step 642, if there is a check call present in the user-provided program, the analytics system 300 provides details on allocations made by the user-generated program. For example, these details may be records stored as part of step 610. If there is no check call in step 640 or after the check call has completed, the analytics system 300 proceeds to step 612 to determine whether the user-provided program has completed.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
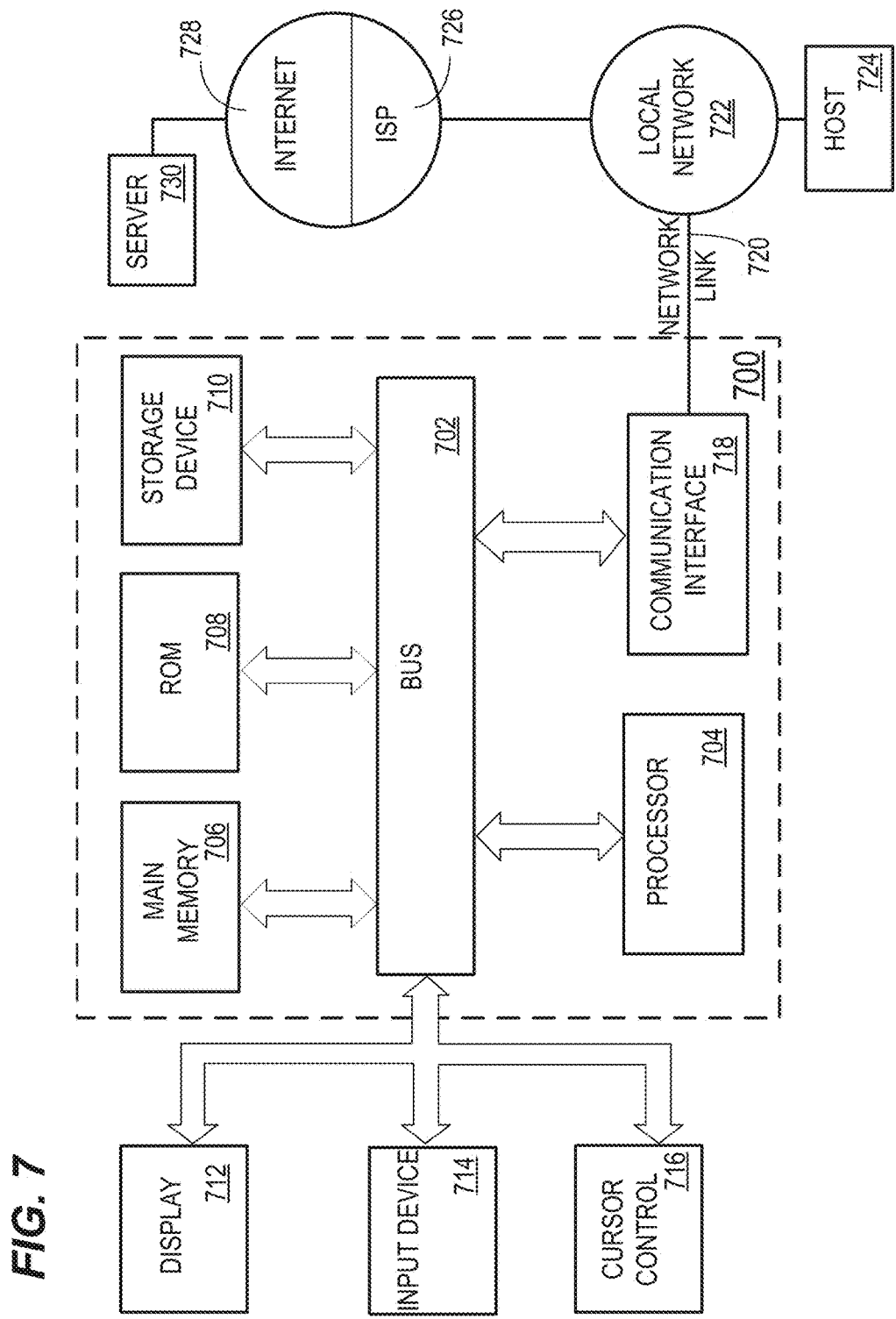
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   executing, on one or more computing devices, a program execution engine;
      wherein the program execution engine is designed to execute user-provided programs;
      wherein the program execution engine includes functions exposed via an application programming interface (API) to user-provided programs that allows user-provided programs to allocate, access, and deallocate in-memory objects;
   in response to a call from a user-provided program through the API to allocate an in-memory object, the program execution engine performing the steps of:
      allocating a region of volatile memory for the in-memory object;
      adding, to a set of memory-usage records, a memory-usage record that corresponds to an in-memory object that is not yet deallocated;
   at a point in time before an end of execution of the user-provided program, receiving, from a process other than the user-provided program, a request for information about currently allocated in-memory objects associated with the user-provided program; and
   based on the request, using the set of memory-usage records to generate a response that identifies a set of currently-allocated in-memory objects that have been allocated by the user-provided program and not yet deallocated by the user-provided program.

2. The method of claim 1 wherein the request is programmed to occur automatically after execution of the user-provided program ends.

3. The method of claim 1 wherein the request is a second call to the API.

4. The method of claim 2 further comprising determining to deallocate one or more currently-allocated in-memory objects from the set of currently-allocated in-memory objects.

5. The method of claim 1 wherein:
   the user-provided program makes calls to allocate a plurality of different types of in-memory objects; and
   metadata included in the response includes, for at least one currently-allocated in-memory object in the set of currently-allocated in-memory objects, information that indicates a type of the at least one currently-allocated in-memory object.

6. The method of claim 1 further comprising:
   while the program execution engine is executing the user-provided program, the program execution engine receiving a second call from the user-provided program, through the API, to deallocate the in-memory object;
   in response to the second call, the program execution engine performing the steps of:
      deallocating the region of volatile memory; and
      removing the memory-usage record from the set of memory-usage records.

7. The method of claim 1 further comprising:
   determining, based on the response, a total amount of memory used by all in-memory objects in the set of currently-allocated in-memory objects.

8. The method of claim 7 wherein:
   metadata about the in-memory object includes a size of the in-memory object; and
   the method further comprises, in response to a change in the size of the in-memory object, updating the size indicated in the memory-usage record.

9. The method of claim 1 further comprising:
   while the program execution engine is executing the user-provided program, the program execution engine receiving a second call from another user-provided program, through the API, to allocate another in-memory object.

10. The method of claim 1 wherein the region of volatile memory comprises a region of dynamic random-access memory.

11. The method of claim 1 wherein the memory-usage record indicates that the in-memory object is one of:
   an array type,
   a graph type, or
   a linked list type.

12. A method comprising:
   executing, on one or more computing devices, a program execution engine;
      wherein the program execution engine is designed to execute user-provided programs;
      wherein the program execution engine includes functions exposed via an application programming interface (API) to user-provided programs that allows user-provided programs to allocate, access, and deallocate in-memory objects;
   while the program execution engine is executing a user-provided program, the program execution engine receiving a call from the user-provided program, through the API, to allocate an in-memory object;
in response to the call, the program execution engine performing the steps of:
allocating a region of volatile memory for the in-memory object;
adding a memory-usage record for the in-memory object that includes data about the in-memory object to a set of memory-usage records;
wherein a memory-usage record in the set of memory-usage records corresponds to an in-memory object, allocated by the program execution engine in response to an allocation call from the user-provided program, that has not yet been deallocated;
at a point in time, receiving a request for information about currently allocated in-memory objects associated with the user-provided program;
in response to the request, performing the steps of:
using the set of memory-usage records to determine a set of currently-allocated in-memory objects that have been allocated by the user-provided program and not yet deallocated by the user-provided program;
generating a response to the request that identifies the set of currently-allocated in-memory objects,
wherein the call specifies whether to create the memory-usage record.

13. One or more non-transitory computer-readable media storing instructions which, when executed by one or more processors, cause:
executing, on one or more computing devices, a program execution engine;
wherein the program execution engine is designed to execute user-provided programs;
wherein the program execution engine includes functions exposed via an application programming interface (API) to user-provided programs that allows user-provided programs to allocate, access, and deallocate in-memory objects;
in response to a call from the user-provided program through the API to allocate an in-memory object, the program execution engine performing the steps of:
allocating a region of volatile memory for the in-memory object;
adding, to a set of memory-usage records, a memory-usage record that corresponds to an in-memory object that is not yet deallocated;
at a point in time before an end of execution of the user-provided program, receiving, from a process other than the user-provided program, a request for information about currently allocated in-memory objects associated with the user-provided program;
based on the request, using the set of memory-usage records to generate a response that identifies a set of currently-allocated in-memory objects that have been allocated by the user-provided program and not yet deallocated by the user-provided program.

14. The one or more non-transitory computer-readable media of claim 13 wherein the request is programmed to occur automatically after execution of the user-provided program ends.

15. The one or more non-transitory computer-readable media of claim 14 further comprising, based on the response, determining to deallocate one or more currently-allocated in-memory objects from the set of currently-allocated in-memory objects.

16. The one or more non-transitory computer-readable media of claim 13 wherein the request is a second call to the API and the point in time is before an end of execution of the user-provided program.

17. The one or more non-transitory computer-readable media of claim 13 wherein:
the user-provided program makes calls to allocate a plurality of different types of in-memory objects; and
metadata included in the response includes, for each currently-allocated in-memory object in the set of currently-allocated in-memory objects, information that indicates a type of said currently-allocated in-memory object.

18. A method comprising:
executing, on one or more computing devices, a program execution engine;
wherein the program execution engine is designed to execute user-provided programs;
wherein the program execution engine includes functions exposed via an application programming interface (API) to user-provided programs that allows user-provided programs to allocate, access, and deallocate in-memory objects;
while the program execution engine is executing a user-provided program, the program execution engine receiving a call from the user-provided program, through the API, to allocate an in-memory object;
in response to the call, the program execution engine performing the steps of:
allocating a region of volatile memory for the in-memory object; and
adding a memory-usage record for the in-memory object that includes data about the in-memory object to a set of memory-usage records;
wherein a memory-usage record in the set of memory-usage records corresponds to a respective in-memory object, allocated by the program execution engine in response to a respective allocation call from the user-provided program, that has not yet been deallocated;
at a point in time, receiving a request for information about currently allocated in-memory objects associated with the user-provided program;
in response to the request, performing the steps of:
using the set of memory-usage records to determine a set of currently-allocated in-memory objects that have been allocated by the user-provided program and not yet deallocated by the user-provided program; and
generating a response to the request that identifies the set of currently-allocated in-memory objects and includes a snapshot of a call stack maintained by the program execution engine for the user-provided program at the time of the call.

19. A method comprising:
executing, on one or more computing devices, a program execution engine;
wherein the program execution engine is designed to execute user-provided programs;
wherein the program execution engine includes functions exposed via an application programming interface (API) to user-provided programs that allows user-provided programs to allocate, access, and deallocate in-memory objects;
while the program execution engine is executing a user-provided program, the program execution engine receiving a call from the user-provided program, through the API, to allocate an in-memory object;

in response to the call, the program execution engine performing the steps of:

allocating a region of volatile memory for the in-memory object;

adding a memory-usage record for the in-memory object that includes data about the in-memory object to a set of memory-usage records;

wherein a memory-usage record in the set of memory-usage records corresponds to an in-memory object, allocated by the program execution engine in response to an allocation call from the user-provided program, that has not yet been deallocated;

at a point in time, receiving a request for information about currently allocated in-memory objects associated with the user-provided program;

in response to the request, performing the steps of:

using the set of memory-usage records to determine a set of currently-allocated in-memory objects that have been allocated by the user-provided program and not yet deallocated by the user-provided program;

generating a response to the request that identifies the set of currently-allocated in-memory objects;

determining, based on the response, a length of time from when the program execution engine began to execute the user-provided program to the point in time.

20. One or more non-transitory computer-readable media storing instructions which, when executed by one or more processors, cause:

executing, on one or more computing devices, a program execution engine;

wherein the program execution engine is designed to execute user-provided programs;

wherein the program execution engine includes functions exposed via an application programming interface (API) to user-provided programs that allows user-provided programs to allocate, access, and deallocate in-memory objects;

while the program execution engine is executing a user-provided program, the program execution engine receiving a call from the user-provided program, through the API, to allocate an in-memory object;

in response to the call, the program execution engine performing the steps of:

allocating a region of volatile memory for the in-memory object;

adding a memory-usage record for the in-memory object that includes data about the in-memory object to a set of memory-usage records;

wherein a memory-usage record in the set of memory-usage records corresponds to a respective in-memory object, allocated by the program execution engine in response to a respective allocation call from the user-provided program, that has not yet been deallocated;

at a point in time, receiving a request for information about currently allocated in-memory objects associated with the user-provided program;

in response to the request, performing the steps of:

using the set of memory-usage records to determine a set of currently-allocated in-memory objects that have been allocated by the user-provided program and not yet deallocated by the user-provided program; and generating a response to the request that identifies the set of currently-allocated in-memory objects and includes a snapshot of a call stack maintained by the program execution engine for the user-provided program at the time of the call.

* * * * *

UNITED STATES PATENT AND TRADEMARK OFFICE
CERTIFICATE OF CORRECTION

PATENT NO. : 10,102,047 B2  Page 1 of 1
APPLICATION NO. : 15/978061
DATED : October 16, 2018
INVENTOR(S) : Weld et al.

It is certified that error appears in the above-identified patent and that said Letters Patent is hereby corrected as shown below:

In the Drawings

On sheet 1 of 5, in FIG. 1, Line 12, delete "ANAYTICS ENGINE" and insert -- ANALYTICS ENGINE --, therefor.

In the Specification

In Column 3, Line 11, delete "that that" and insert -- that --, therefor.

In Column 10, Line 58, delete "my_size),"" and insert -- my_size);" --, therefor.

Signed and Sealed this
Thirty-first Day of December, 2019

Andrei Iancu
*Director of the United States Patent and Trademark Office*